United States Patent
Himmel

(10) Patent No.: US 7,839,286 B2
(45) Date of Patent: Nov. 23, 2010

(54) METHOD FOR CARRYING OUT IT-ASSISTED CUSTOMER-ORIENTED AIRLINE BAGGAGE MANAGEMENT

(75) Inventor: Thomas Himmel, Rückersdorf (DE)

(73) Assignee: Siemens Industry, Inc., Alpharetta, GA (US)

( * ) Notice: Subject to any disclaimer, the term of this patent is extended or adjusted under 35 U.S.C. 154(b) by 298 days.

(21) Appl. No.: 12/082,588

(22) Filed: Apr. 11, 2008

(65) Prior Publication Data

US 2009/0091452 A1 Apr. 9, 2009

(30) Foreign Application Priority Data

Apr. 12, 2007 (DE) .................. 10 2007 017 294

(51) Int. Cl.
*G08B 13/14* (2006.01)

(52) U.S. Cl. .............. 340/572.1; 340/572.4; 340/572.8; 250/358.1; 250/359.1; 235/375; 235/385; 235/492; 705/5; 705/6; 705/13; 705/28

(58) Field of Classification Search .............. 340/572.1, 340/572.4, 572.8; 250/358.1, 359.1; 235/375, 235/389, 492; 705/5, 6, 13, 28
See application file for complete search history.

(56) References Cited

U.S. PATENT DOCUMENTS 5,299,116 A * 3/1994 Owens et al. .................. 705/28
7,286,634 B2 * 10/2007 Sommer et al. ............... 378/57

FOREIGN PATENT DOCUMENTS

DE 102005012933 B3 10/2006
DE 60210943 T2 12/2006

* cited by examiner

*Primary Examiner*—Tai T Nguyen

(57) ABSTRACT

The invention relates to a method for carrying out IT-assisted, customer-oriented airline baggage management, in which the transport route of the airline baggage between check-in and the sorting destination is monitored with the aid of legible information carriers. In order to provide passengers with specific information relating to what has happened to their airline baggage and, if appropriate, to allow losses to be identified quickly, video monitoring is on the one hand carried out with respect to the transport route and, on the other hand, the transport route of the pieces of airline baggage is tracked by successive readers on the basis of the legible information carriers which have been applied to the pieces of airline baggage.

11 Claims, 2 Drawing Sheets

METHOD FOR CARRYING OUT IT-ASSISTED CUSTOMER-ORIENTED AIRLINE BAGGAGE MANAGEMENT

CROSS REFERENCE TO RELATED APPLICATIONS

This application claims the benefits of German application No. 10 2007 017 294.1 filed Apr. 12, 2007, and is incorporated by reference herein in its entirety.

FIELD OF INVENTION

The invention relates to a method for carrying out IT-assisted, customer-oriented airline baggage management with the transport route of the airline baggage being monitored between check-in and the sorting destination with the aid of legible information carriers which are applied to the pieces of airline luggage.

BACKGROUND OF THE INVENTION

Since increasing amounts of airline baggage are being lost, or at least cannot be picked up by the passengers at the destination airport because, for example, the airline baggage has been loaded in the wrong machine, it is desirable for many airline passengers to know whether their baggage is on board the aircraft that they have entered, or at least that it will be available at the destination airport. Even if the baggage has accidentally not been placed on board, it is comforting for the airline passenger to be provided with more detailed information about what has happened to his airline baggage, without subsequently having to tediously search for it himself. On the other hand, there are also situations in which the airline baggage disappears for various reasons or is stolen on the transport route between check-in and the sorting destination, or else from the sorting installation, without having to be removed from the sorting process for operational reasons, and without there being any capability prior to this to know why it is missing. Overall, this results in an uncertain situation.

SUMMARY OF INVENTION

The present invention is based on this problem and has the object of providing passengers with information about the status of their airline baggage quickly and reliably even after the baggage has been handed over at the check-in desk, and of providing the necessary information in the event of loss in order to make binding statements about the loss of the airline baggage.

The invention is characterized by a video recording system which monitors each subarea of the transport route of the airline baggage, and by readers which are installed in the subareas of the transport route for the information carriers which have been applied to the airline baggage, with the recordings of the video recording system from each subarea through which the piece of airline baggage passes being stored at least for a defined temporary time period, and with the reading result from at least the reader which the piece of airline baggage passed most recently being passed to the control computer for storage, and with a signal being triggered if the expected reading from the next reader in the transport direction following a reader has not been received before the sorting destination is reached, with this signal being used to check the cause of the lack of the reading, with the aid of the last video recording of the piece of airline baggage.

Video monitoring systems for airline baggage transport installations are known per se. The present invention complements the known installations in that every subarea of the transport route of the airline baggage is now monitored comprehensively. It is therefore possible to document the entire transport route of the airline baggage, by storing the individual recordings of the video recording system of each subarea of the transport route. In addition to the video recording system, readers for the legible information carriers which have been applied to the pieces of baggage are provided in the subareas of the transport route, and their reading results are supplied to the control computer, where they are stored. If the control computer finds that a piece of baggage has obviously not passed the next reader, as a result of a lack of a reading which should actually have followed at the next reader after passing through an upstream reader before this, then a signal is triggered which initiates a check of the cause. This is done with the aid of the stored last video recordings which were made of the piece of luggage at the appropriate point in the transport route. It is then possible to tell from the video recording why the piece of luggage has not reached the second reader, for example because of a jam in the installation or theft.

In order to allow tracking, particularly in the latter case, where a piece of luggage has disappeared from the installation and where it is missing, it is helpful to know the appearance of the piece of luggage. A further feature of the invention therefore proposes that, before the airline baggage is passed to the transport route, each piece of airline baggage is recorded photographically, and the image is stored to allow subsequent evaluation. The stored photograph helps the identification of the piece of airline baggage during the subsequent video analysis, thus assisting further investigations for its loss. Together with the photograph, the passenger-related data is recorded in the control computer, thus allowing association with the passenger without any problems.

In order to ensure that the information carriers which have been applied to the piece of airline baggage are read correctly, the invention provides that, before being passed to the transport route, the piece of airline baggage is checked for any old unusable information carriers which may be present, and if appropriate these are removed. This makes it possible to ensure that a data storage medium which has inadvertently remained on a suitcase from a previous journey does not corrupt the reading result, or make it unusable.

One advantageous refinement of the invention provides that, before being passed to the transport route, each piece of airline baggage is provided with an RFID tag, possibly in addition to the information carrier on which a barcode is printed. The identification of a piece of airline baggage and the storage of flight information data can best be achieved by RFID tags, because any desired information can be stored on them and read from them. In general, pieces of airline baggage are provided with barcode labels, which are normally looped around the handle of the piece of baggage, and are secured. RFID tags can additionally be adhesively bonded to the piece of baggage and/or to this information carrier in the form of a barcode strip, thus allowing redundant monitoring when the information carriers are read. The invention may, of course, be carried out just as well with pure barcode information carriers, in the same way as with information carriers which have only RFID tags.

In order to allow all types of information carriers to be read, a supplementary feature of the invention provides for the readers distributed over the transport route to be in the form of RFID readers and/or barcode readers. This allows even pieces of baggage with both types of information carriers to be recorded, for example if the barcode cannot be read by the scanner.

In addition to recording and storage in the video systems, it is possible according to a further feature of the invention for the video recordings to be displayed on central monitors. This allows "round the clock" monitoring of all the installation subareas, with the transport route of the pieces of airline baggage being monitored on the monitor.

In a situation in which the airline baggage has been lost, the invention provides for the stored image of the piece of airline baggage to be compared with the video recordings, and that the point at which the piece of airline baggage has been lost be determined. This is possible by using the readers and the control computer in the installation to identify where the piece of airline baggage was last, that is to say where its information was last read and at what point after this it was no longer possible to confirm the presence of the airline baggage. This area is that which must be checked to find out what has happened to the piece of airline baggage, for example whether it was involved in a jam before the next reader or whether it has been removed from the installation.

The invention also provides that, once the airline baggage has passed through correctly, the information about the correct loading of an airline passenger's airline baggage is passed to the airline passenger at the end of the transport route or after reaching the sorting destination. This information can be made available to him in many ways, for example on the basis that, unless he receives a special message, he can assume that his airline baggage has passed correctly through the installation and has been loaded in the aircraft. In the situation in which the airline baggage has not arrived at the destination location, he will receive a message at the gate. This message can likewise be provided via a display or by a spoken message on the aircraft passenger's cell phone, although this is dependent on the airline passenger having given his cell phone number on check-in.

Finally, it is also possible for the ground personnel to give the airline passenger the information on leaving the gate that his airline baggage is not on board, and that further steps are being or have been initiated. In the same way, if it has not been possible to provide the airline passenger with the information on departure, the message can be passed to him on arrival at the destination airport that the airline baggage was not on board, thus avoiding unnecessary waiting times at the carousel. The airline passenger can then immediately check, for example with the "lost baggage" desk, and can be provided with information about the loss of the baggage. If the baggage has been misplaced, then the piece of baggage can be identified and searched for specifically with the aid of the photographs which have been taken during the check-in process at the departure airport and can be transmitted digitally to the destination airport.

BRIEF DESCRIPTION OF THE DRAWINGS

The invention is illustrated in the drawings, and will be described in the following text.

Referring to FIG. 1 the check-in area is shown at 1 in the plan view, while the passengers check-in the baggage at the desk and the airport ground personnel place it on the conveyor 3 for further transport to the baggage sorting installation. The baggage is passed via the downstream conveyor 4 in the direction of the arrow to the pre-sorter, which is annotated overall 5. This pre-sorter is followed by input and output areas from the terminal, which are annotated 6 and 7, as well as handover areas for transfer baggage, which are annotated 8. The baggage passed to the pre-sorter 5 is passed in the direction of the arrow to the X-ray stations 10, where the security check is carried out and impermissible safety-relevant baggage contents are searched for. The approved baggage is transported further in the direction of the arrow and is passed to the main sorter 9 unless it has already been diverted into the early baggage store 11 where, for example, baggage handed in the previous evening can be temporarily stored. Furthermore, a secondary conveyor 15 is provided in the area of the pre-sorter 5 where baggage which it has not been possible to read electronically is segregated. This manual reading area is annotated 12; baggage information is recorded manually there and the baggage that has been registered in this way is returned into the conveyor path of the pre-sorter 5, having been provided with appropriate information.

Figure 1:
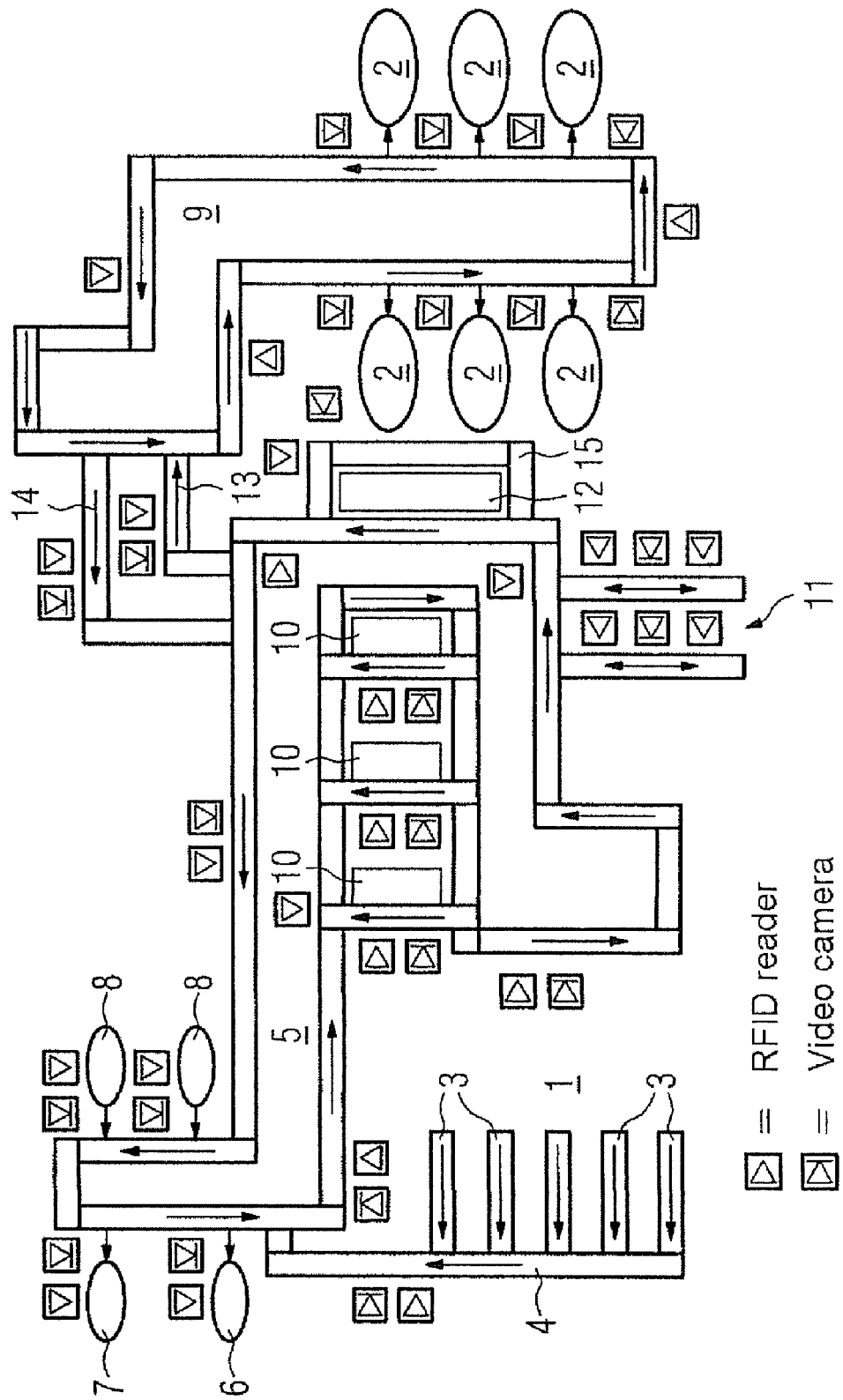
FIG. 1 is an exemplary embodiment showing a highly simplified illustration of the baggage handling plan at an airport.

The baggage is passed via the linking conveyor 13 to the main sorter 9 (and possibly via the linking conveyor 14 back to the pre-sorter 5). The baggage is passed from the main sorter 9 to the individual laterals 2, where distribution to the individual flights takes place.

Figure 2:
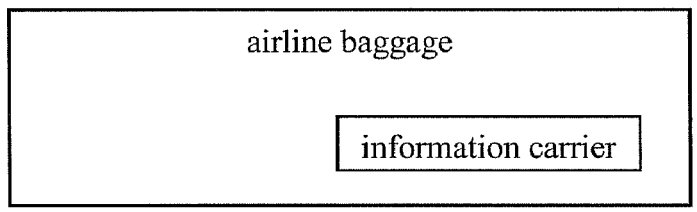
FIG. 2 shows an exemplary embodiment of the information carrier attached to the airline baggage.
Figure 3:
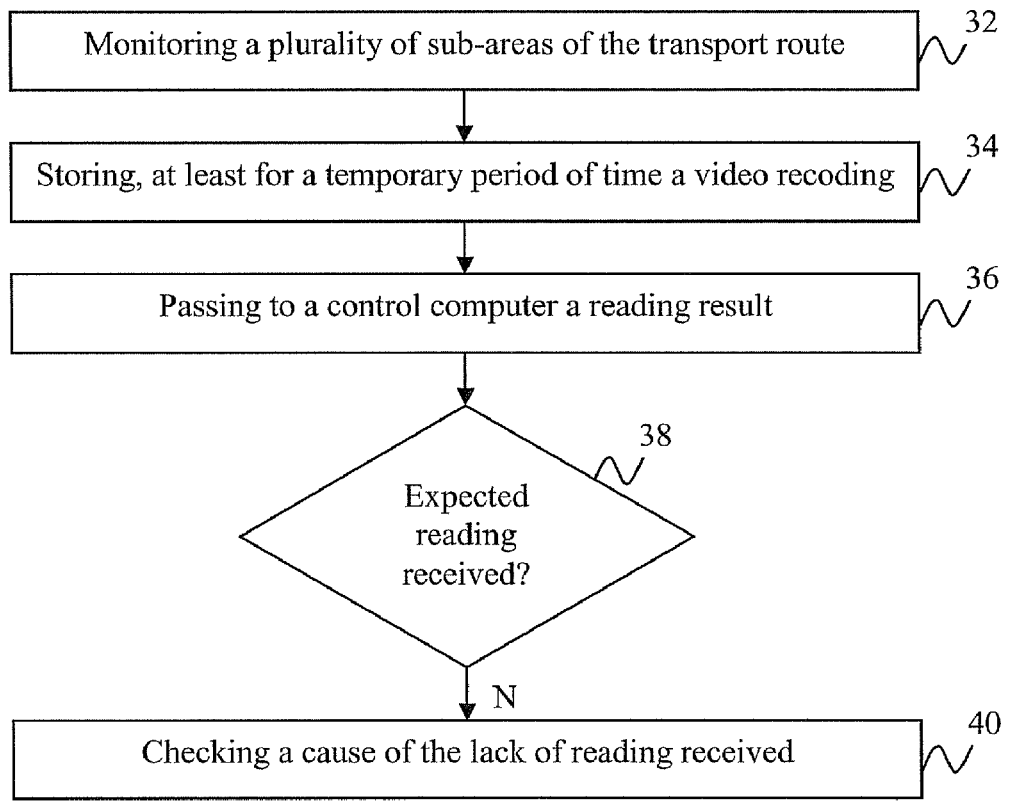
FIG. 3 shows an exemplary embodiment of a process flow in accordance with the present invention.

FIGS. 2 and 3 show a video recording system which monitors each subarea of the transport route of the airline baggage 32, and by readers which are installed in the subareas of the transport route for the information carriers which have been applied to the airline baggage, with the recordings of the video recording system from each subarea through which the piece of airline baggage passes being stored at least for a defined temporary time period 34, and with the reading result from at least the reader which the piece of airline baggage passed most recently being passed to the control computer for storage 36, and with a signal being triggered if the expected reading from the next reader in the transport direction following a reader has not been received before the sorting destination is reached 38, with this signal being used to check the cause of the lack of the reading 40 with the aid of the last video recording of the piece of airline baggage.

The invention claimed is:

1. A method for carrying out information technology assisted, customer-oriented airline baggage management with a transport route of an airline baggage being monitored between a check-in and a sorting destination, an information carrier attached to the airline baggage, the method comprising:

monitoring a plurality of sub-areas of the transport route of the airline baggage via a plurality of video recorders and a plurality of readers such that each of the plurality of sub-areas is provided with at least one of the plurality of video recorders at least one of the plurality of readers;

storing, at least for a defined temporary period of time, a video recording from each of the plurality of video recorders which the airline baggage passes;

passing to a control computer for adjustment and/or for storage a reading result from a most recent of the plurality of readers in which the airline baggage passed most recently; and when an expected reading from a next reader of the plurality of readers, which follows the most recent of the plurality of readers in a transport direction, has not been received before the sorting destination is reached checking a cause of the expected reading not being received via the video recording of the airline baggage from a last of the video recorders in which the airline baggage passed.

2. The method for carrying out airline baggage management as claimed in claim 1, further comprising:

recording a photographic image of the airline baggage, and storing the photographic image to allow subsequent evaluation before the airline baggage is passed to the transport route.

3. The method for carrying out airline baggage management as claimed in claim 2, wherein if the airline baggage is lost, the stored photographic image of the airline baggage is compared with the video recording from at least one of the plurality of video recorders which the airline baggage passed.

4. The method for carrying out airline baggage management as claimed in claim 1, when the airline baggage includes an old information carrier the method further comprising:

removing the old information carrier from the airline baggage before the airline baggage is passed to the transport route.

5. The method for carrying out airline baggage management as claimed in claim 1, wherein the information carrier includes a barcode.

6. The method for carrying out airline baggage management as claimed in claim 1, wherein each of the plurality of readers is a RFID reader, or a barcode reader.

7. The method for carrying out airline baggage management as claimed in claim 1, wherein the video recording is displayed on a central monitor.

8. The method for carrying out airline baggage management as claimed in one of claim 1, wherein an information about a correct loading or an absence of a person's airline baggage is passed to the airline passenger at an end of the transport route or after reaching the sorting destination.

9. The method for carrying out airline baggage management as claimed in claim 8, wherein the information about the absence of the airline baggage is passed to an airline passenger on a display via a mobile telephone device of the airline passenger or verbally via ground personnel.

10. The method for carrying out airline baggage management as claimed in claim 1, wherein the information carrier includes an RFID.

11. The method for carrying out airline baggage management as claimed in claim 1, wherein the information carrier includes a barcode and an RFID.

* * * * *